(12) United States Patent
Nielsen et al.

(10) Patent No.: US 11,982,830 B2
(45) Date of Patent: May 14, 2024

(54) GLAZING

(71) Applicant: SAINT-GOBAIN GLASS FRANCE, Courbevoie (FR)

(72) Inventors: Tobias Nielsen, Cologne (DE); Semjon Mooraj, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/005,316

(22) PCT Filed: Oct. 28, 2021

(86) PCT No.: PCT/EP2021/080003
§ 371 (c)(1),
(2) Date: Jan. 12, 2023

(87) PCT Pub. No.: WO2022/096365
PCT Pub. Date: May 12, 2022

(65) Prior Publication Data
US 2023/0324598 A1    Oct. 12, 2023

(30) Foreign Application Priority Data
Nov. 5, 2020 (EP) .................... 20205858

(51) Int. Cl.
*F21V 8/00* (2006.01)
*G02B 5/32* (2006.01)

(52) U.S. Cl.
CPC ............. *G02B 6/0053* (2013.01); *G02B 5/32* (2013.01); *G02B 6/0055* (2013.01); *G02B 6/0083* (2013.01)

(58) Field of Classification Search
CPC .. G02B 6/0053; G02B 6/0055; G02B 6/0083; G02B 5/32
See application file for complete search history.

(56) References Cited

FOREIGN PATENT DOCUMENTS

| JP | 2011-086547 A | | 4/2011 | |
|----|---|---|---|---|
| JP | 2011086547 A | * | 4/2011 | |
| JP | 2015-043321 A | | 3/2015 | |
| JP | 2015043321 A | * | 3/2015 | ............. F21S 2/005 |
| WO | WO 2008/047442 A1 | | 4/2008 | |
| WO | WO-2008047442 A1 | * | 4/2008 | .......... G02B 6/0016 |
| WO | WO 2010/049638 A1 | | 5/2010 | |
| WO | WO 2013/053629 A1 | | 4/2013 | |
| WO | WO 2013/110885 A1 | | 8/2013 | |
| WO | WO 2014/060409 A1 | | 4/2014 | |

(Continued)

OTHER PUBLICATIONS

International Search Report as issued in International Patent Application No. PCT/EP2021/080003, dated Dec. 20, 2021.

*Primary Examiner* — Mary Ellen Bowman
(74) *Attorney, Agent, or Firm* — Pillsbury Winthrop Shaw Pittman LLP

(57) ABSTRACT

A glazing includes at least one first pane having a first primary surface and a second primary surface, at least one light source, at least one transparent light coupling system, wherein the light source is connected to the first primary surface of the first pane via the light coupling system such that light from the light source can be coupled into the first pane, and at least one light outcoupling system for outcoupling light from the first pane via at least one of the primary surfaces.

19 Claims, 6 Drawing Sheets

(56) References Cited

FOREIGN PATENT DOCUMENTS

Figure 1A:
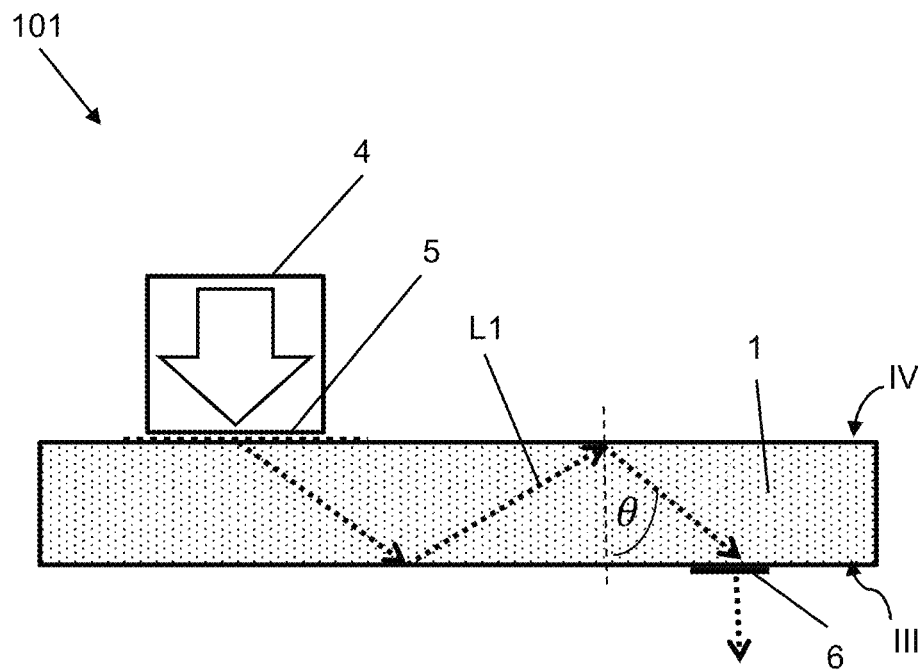

| WO | WO 2015/095288 A2 | 6/2015 |
| WO | WO 2018/178591 A1 | 10/2018 |
| WO | WO 2019/105855 A1 | 6/2019 |

\* cited by examiner

GLAZING

CROSS-REFERENCE TO RELATED APPLICATIONS

This application is the U.S. National Stage of PCT/EP2021/080003, filed Oct. 28, 2021, which in turn claims priority to European patent application number 20205858.2 filed Nov. 5, 2020. The content of these applications are incorporated herein by reference in their entireties.

The invention relates to an illuminable or illuminated glazing, preferably as a single pane or composite pane, and in particular a roof panel.

In illuminated glazings or light distribution systems, light is usually coupled into a planar light guide of the glazing by utilizing the effect of total reflection, known, for example, from WO 2008/047442 A1, JP 2011 086547 A, or JP 2015 043321 A.

From WO 2010/049638 A1, WO 2013/053629 A1, WO 2014/060409 A1, or WO 2015/095288 A2, it is known to couple light via the side surface (also referred to as side edge) of a glass pane. If the light source is placed very close to the glass edge, light can be coupled into the light guide very efficiently and over the entire width of the light guide in this way. As a result, very homogeneous planar illumination can be achieved. This principle is commonly known and very widely used, e.g., for display backlighting and decorative lighting applications.

In other applications, for example, in the case of a roof panel of a vehicle glazing in the automotive sector, such light coupling via one of the side surfaces is possible only with difficulty since this is glued into the body of the vehicle and, moreover, the pane typically has a round-ground edge, the so-called "C-grind". Since the side surface must be as smooth as possible for the most efficient light coupling possible, complex smoothing and polishing or other special processing of the side surface is required.

From WO 2013/110885 A1, WO 2018/178591 A1, or WO 2019/105855 A1, it is known to insert light sources in cutouts, for example, in mechanically drilled holes, and thereby couple light into the glass pane. However, homogeneous illumination of the entire pane is made difficult by the point-wise coupling of light. Furthermore, for technical reasons, the edge of the drilled hole is matte, which also reduces the efficiency of the light coupling. In addition, the drilled holes cause mechanical weakening of the glazing.

In WO 2014/060409 A1, an additional single safety pane, the sole function of which is that of a light guide, is attached by means of a sheathing or housing under the actual composite glass pane. This results in considerable added production expense and additional weight and space requirement for the entire roof panel.

The object of the present invention consists now in providing an improved glazing that can be produced simply and economically and that enables particularly efficient illumination of the glazing.

The object of the present invention is accomplished according to the invention by a glazing in accordance with the independent claim 1. Preferred embodiments are apparent from the subclaims.

The glazing according to the invention comprises at least the following features:
- at least one first pane having a first primary surface and a second primary surface,
- at least one light source,
- at least one, preferably transparent, light coupling means, wherein the light source is connected to the first primary surface of the first pane via the light coupling means such that light from the light source can be coupled into the first pane, and
- at least one light outcoupling means, for outcoupling light from the first pane via
- at least one of the primary surfaces.

In the context of the invention, "transparent" refers to an object, in particular a light coupling means, a light outcoupling means, a pane, and/or a transparent body, that has transmittance in the visible spectral range greater than 20%, preferably greater than 50%, particularly preferably greater than 70%, in particular greater than 85%.

In an advantageous embodiment of the glazing according to the invention, the light coupling means is suitable for deflecting part of the incident light in transmission from the light source by scattering, reflection, refraction, or diffraction.

In another advantageous embodiment of the glazing according to the invention, the light coupling means is suitable for coupling part of the incident light from the light source into the first pane at an angle $\theta$ greater than or equal to the angle $\theta_{total}$ of the total reflection in the first pane. The angle $\theta$ is the angle of incidence or angle of emergence relative to the perpendicular on the pane-primary surface. Advantageously, the fraction of light coupled into the first pane from the light source at an angle $\theta$ greater than or equal to the angle $\theta_{total}$ of the total reflection is increased by the light coupling means by a factor of at least 50, preferably at least 200.

In an advantageous embodiment, the light coupling means is introduced into the first primary surface of the first pane, preferably by laser patterning, mechanical patterning, such as sandblasting, and/or etching, preferably chemical or physical etching. Particularly suitable is a flat, irregular surface patterning that results in diffuse light scattering when illuminated. Alternatively, linear or grid (e.g., cross-grid) structures can be introduced.

In another advantageous embodiment in particular, the light coupling means according to the invention is not integrally formed with the first pane.

In an alternative advantageous embodiment, the light coupling means is printed onto the first primary surface of the first pane, for example, by inkjet or screen printing. Advantageously, the imprint contains particles suitable for scattering, refracting, diffracting, or reflecting light.

In another alternative advantageous embodiment, the light coupling means includes or consists of a transparent body that is materially bonded to the first primary surface of the first pane, for example, by adhesive bonding.

The transparent body according to the invention preferably includes or consists of a patterned plastic film or plastic sheet, for example, with light-scattering, light-refracting, light-diffracting, or light-reflecting particles, a holographic film. The transparent body according to the invention can also include or consists of a flat arrangement of microprisms, for example, of pyramids arranged randomly or in a grid pattern or of linearly arranged steps (also referred to in the following as a step prism). Typically, the transparent body has a surface pattern of such microprisms. Such microprisms can advantageously be produced by mechanical processing such as stamping or embossing, by chemical etching, by photolithography, or other transfer techniques.

The refractive index $n_{10}$ of the transparent body is preferably from $n_1-0.3$ to $n_1+0.3$, particularly preferably from $n_1-0.2$ to $n_1+0.2$, and in particular from $n_1-0.15$ to $n_1+0.15$, where $n_1$ is the refractive index of the first pane.

In another alternative advantageous embodiment, the light coupling means and in particular the transparent body is part of the light source, for example, a section of the housing.

It goes without saying that a glazing according to the invention can have one or a plurality of light sources, the light of which is coupled into the first pane by one or a plurality of the above-described light coupling means, with the possibility of also combining different light coupling means in one glazing.

In an advantageous embodiment of a glazing according to the invention, the light source is suitable for emitting visible light. Alternatively, it can emit infrared or ultraviolet light, which is preferably converted into visible light by florescent or luminescent particles, preferably as a component of the light outcoupling means.

In an advantageous embodiment of a glazing according to the invention, the light source includes or consists of at least one light-emitting diode (LED), preferably at least one organic light-emitting diode (OLED), at least one laser diode, at least one incandescent lamp, and/or at least one gas discharge lamp.

In an advantageous embodiment of the glazing according to the invention, the light outcoupling means is suitable for outcoupling part of the light guided in the first pane, preferably by scattering, reflection, refraction, or diffraction, at at least one of the primary surfaces of the first pane.

Advantageously, the light outcoupling means is arranged in or introduced into the first primary surface and/or the second primary surface and/or within the first pane.

For this purpose, the light outcoupling means is preferably introduced into the first primary surface and/or into the second primary surface by laser patterning, mechanical patterning, such as sandblasting, and/or by etching.

Alternatively, or in combination, the light outcoupling means can be materially bonded to the first primary surface and/or to the second primary surface of the first pane, preferably by printing or bonding an ink, a paste, or particles, particularly preferably light-scattering, light-refracting, or light-reflecting particles.

Alternatively, or in combination, the light outcoupling means can include or consist of particles, particularly preferably of light-scattering, light-refracting, light-diffracting, or light-reflecting particles or cavities that are arranged within the first pane.

Alternatively, or in combination, the light outcoupling means can include or consist of at least one transparent body, which is materially bonded to the first or second primary surface of the first pane, for example, by adhesive bonding, wherein the transparent body preferably includes or consists of a) a patterned plastic film or plastic sheet or
b) a transmission holographic film.

Advantageously, the patterned plastic film or plastic sheet has a flat arrangement of microprisms such as a step prism.

Alternatively, or in combination, the light outcoupling means can be a reflecting body, which is materially bonded to the second or the first primary surface of the first pane, for example, by adhesive bonding, wherein the reflecting body preferably includes or consists of a) a patterned plastic film or plastic sheet or
b) a transmission holographic film.

Advantageously, the patterned plastic film or plastic sheet has a flat arrangement of microprisms such as a step prism.

If, for example, such a light outcoupling means is arranged on the second primary surface of the first pane, the light is outcoupled, for example, via the first primary surface and is primarily detectable by an observer viewing the first pane via the first primary surface.

Alternatively, or in combination, the light outcoupling means can be a transparent body that is bonded to the first or the second primary surface of the first pane, preferably materially, for example, by adhesive bonding. Advantageously, the transparent body then includes or consists of a preferably patterned, particularly preferably a transparent layer, plastic film, or plastic sheet that is diffusely scattering or directionally refracting, for example, by microprisms, whose refractive index $n_{10'}$ is substantially greater than $n_1$. In particular, $n_{10}$ is then greater than $n_1$ by at least +0.2 or by at least +0.5. Such a light outcoupling means can be, for example, a roughened film coated with titanium oxide (TiOx). If such a light outcoupling means is arranged, for example, on the first primary surface of the first pane, the light is outcoupled, for example, via the first primary surface and is primarily detectable by an observer viewing the first pane via the first primary surface.

The transparent body of the light outcoupling means according to the invention can, in each case, include or consist of a flat arrangement of microprisms, for example, of pyramids arranged randomly or in a grid pattern or of linearly arranged steps (also referred to in the following as a step prism). Typically, the transparent body has a surface pattern of such microprisms. Such microprisms can advantageously be produced by mechanical processing, such as stamping or embossing, by chemical etching, by photolithography, or other transfer techniques.

In an advantageous further development of the invention, the glazing according to the invention has at least one light amplification means. The light amplification means is arranged opposite the light coupling means relative to the first pane. Here, "opposite" preferably meant [sic] that the light amplification means is arranged at least in the region of the orthogonal projection of the light coupling means onto the first pane.

The light amplification means can be directly connected to the second primary surface of the first pane or, optionally, connected via the intermediate layer or further layers, such as, in particular, at least one adhesive layer. In particular, the light amplification means is not integrally formed with the first pane.

The light amplification means according to the invention is in particular suitable for deflecting light emerging from the first pane by reflection, preferably directional reflection, scattering, preferably diffuse scattering, or diffraction back into the first pane, preferably at an angle $\theta$ greater than or equal to $\theta_{total}$.

The light amplification means according to the invention is in particular materially bonded to the second primary surface of the first pane directly or via one or a plurality of intermediate layers.

The light amplification means preferably includes or consists of a highly reflective mirror element, for example, a metal foil, a metallized plastic film, or a non-metallic enhanced specular reflector film (3M ESR), as marketed, for example, by the company 3M.

In another advantageous embodiment of the invention, the metal foil is a copper, silver, gold, or aluminum foil, preferably with a thickness of 50 µm to 1000 µm and preferably of 100 µm to 600 µm. It goes without saying that such films or layers can also be arranged on carrier films, for example, polymeric carrier films, such as polyimide or polyethylene terephthalate (PET).

Due to the highly reflective mirror element, a large proportion of light incident on the light amplification means at an angle θ less than $θ_{total}$ can be deflected back to the light coupling means and, there, it can, for example, be deflected back into the first pane, for example, at a different angle θ greater than or equal to $θ_{total}$.

Adhesive layers or double-sided adhesive films are usually not perfectly plane-parallel, but, instead, have a certain surface corrugation. By adhesively bonding the light amplification means on the first pane with a double-sided adhesive film or an adhesive layer, only part of the light is directly reflected back and another part is changed in its angle θ such that a portion of the light is coupled into the first pane at a desired angle θ greater than or equal to $θ_{total}$. The same thing happens when an intermediate layer, for example, a thermoplastic PVB film, is arranged between the light amplification element and the first pane. This effect is particularly pronounced with highly reflective mirror elements.

In an advantageous glazing according to the invention, a semi-transparent reflective coating is arranged directly on the second primary surface of the first pane, at least in some sections, preferably over the entire surface. The semi-transparent mirroring coating (also referred to as a one-way mirror or a Venetian mirror) consists, for example, of one or a plurality of thin metal oxide layers that are typically applied on the first pane by vacuum cathode sputtering. The semi-transparent mirroring coating is, in contrast to a true mirror, thin enough to have only beam-splitting properties and to reflect only a fraction of incident light.

In an advantageous embodiment of the invention, the glazing is a single glazing, for example, a single pane.

In an alternative embodiment, the glazing according to the invention is a composite pane. In this case, a second pane is preferably joined to the first pane by at least one intermediate layer, preferably by lamination.

In principle, all electrically insulating substrates that are thermally and chemically stable as well as dimensionally stable under the conditions of production and use of the composite pane according to the invention are suitable as the first pane and second pane.

The first pane and/or, if present, the second pane preferably contain or consist of glass, particularly preferably flat glass, most particularly preferably float glass, such as soda-lime glass, borosilicate glass, or quartz glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The first pane and/or second pane are preferably transparent, in particular for use of the panes as a windshield or rear windows of a vehicle or other uses where high light transmittance is desired. In the context of the invention, a pane that has transmittance in the visible spectral range of more than 70% is then understood to be transparent. In particular, at least the first pane and preferably also the second pane are made of clear glass.

However, for panes that are not in the drivers field of vision relevant to traffic, for example, for roof panels, the transmittance can also be much lower, for example, greater than 5%. For this purpose, for example, the second pane and/or the intermediate layer can be tinted or colored.

The thickness of the first pane and/or the second pane can vary widely and can thus be ideally adapted to the requirements of the individual case. Preferably, standard thicknesses of 1.0 mm to 25 mm, preferably of 1.4 mm to 2.5 mm are used for vehicle glass and preferably of 4 mm to 25 mm for furniture, appliances, and buildings. The size of the panes can vary widely and depends on the size of the use according to the invention. The first pane and second pane have, for example, areas of 200 cm² up to 20 m², common in automotive engineering and the architectural sector.

The glazing can have any three-dimensional shape. Preferably, the three-dimensional shape has no shadow zones such that it can, for example, be coated with additional coatings by cathode sputtering. Preferably, the panes are planar or slightly or highly curved in one or more spatial directions. In particular, planar substrates are used. The panes can be colorless or colored.

In the case of a composite pane, the first pane and the second pane are joined to one another by at least one intermediate layer. The intermediate layer is preferably transparent or tinted or colored. The intermediate layer preferably contains at least one plastic, preferably polyvinyl butyral (PVB), ethylene vinylacetate (EVA), and/or polyethylene terephthalate (PET). However, the intermediate layer can also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylenes, polyvinyl fluoride, and/or ethylene tetrafluoroethylene, or copolymers or mixtures thereof. The intermediate layer can be formed by one or even by a plurality of superimposed films, the thickness of a film preferably being from 0.025 mm to 1 mm, typically 0.38 mm or 0.76 mm. The intermediate layers can preferably be thermoplastic and, after lamination, bond the first pane, the second pane, and any other intermediate layers to one another. Particularly advantageous are so-called "acoustic-damping" intermediate layers, which preferably consist of three plies of PVB, with the middle ply softer than the two outer plies.

The intermediate layer can also be a functional intermediate layer, in particular an infrared-radiation-reflecting intermediate layer, an infrared-radiation-absorbing intermediate layer, a UV-radiation-absorbing intermediate layer, an intermediate layer colored at least in some sections, and/or an intermediate layer tinted at least in some sections. The thermoplastic intermediate layer can, for example, also be a band filter film.

The terms "first pane" and "second pane" are chosen to distinguish the two panes in a composite pane according to the invention. No statement regarding the geometric arrangement is associated with the terms. For example, if the composite pane according to the invention is intended, in an opening, for example, of a vehicle or building to separate the interior from the external environment, the first pane can face the interior or the external environment.

The first pane and/or, if present, the second pane can have other suitable coatings known per se, for example, anti-reflection coatings, anti-stick coatings, anti-scratch coatings, photovoltaic coatings, or solar protection coatings or low-E coatings.

Furthermore, the glazing can have further functional elements, in particular electronically controllable optical elements, for example, PDLC elements, electrochromic elements, or the like, which are typically arranged between the first pane and the second pane.

Another aspect of the invention includes a glazing arrangement, comprising a glazing according to the invention and a voltage source or control electronics connected to the light source. The light source can be controlled by the voltage source or control electronics such that it emits light when a voltage is applied.

Another aspect of the invention includes a method for producing a glazing according to the invention, at least comprising:

Arranging a, preferably light-scattering, light-reflecting, light-refracting, or light-diffracting, light coupling means on a first primary surface of a first pane, preferably by laser patterning, mechanical patterning, such as sandblasting, etching, coating, printing, or attaching a transparent body, Arranging at least one light source at the light coupling means as well as arranging at least one light outcoupling means at or in the first pane.

The glazing according to the invention can, for example, be the roof panel, windshield, side window, or rear window of a vehicle or another vehicle glazing, for example, a partition pane in a vehicle, preferably in a rail vehicle or a bus. Alternatively, the glazing can be an architectural glazing, for example, in an exterior façade of a building or a partition pane in the interior of a building, or a built-in component in furniture or appliances.

Another aspect of the invention includes the use of the glazing according to the invention in buildings, in particular in the access area, window area, roof area, or façade area, as a built-in component in furniture and appliances, in means of locomotion for travel on land, in the air, or on water, in particular in trains, watercraft, and motor vehicles, for example, as a windshield, rear window, side window, and/or roof panel.

In the following, the invention is explained in detail with reference to drawings and exemplary embodiments. The drawings are schematic representations and are not-to-scale. The drawings in no way restrict the invention.

Figure 1B:
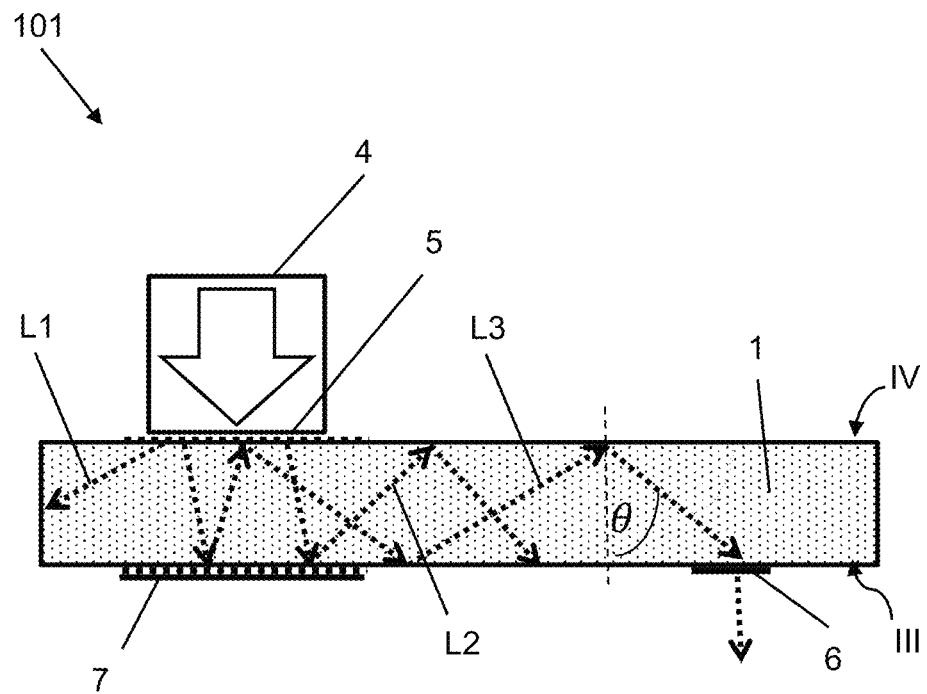
Figure 2A:
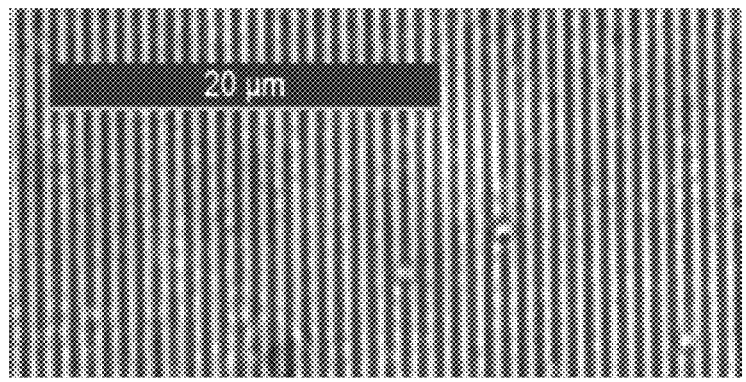
Figure 2B:
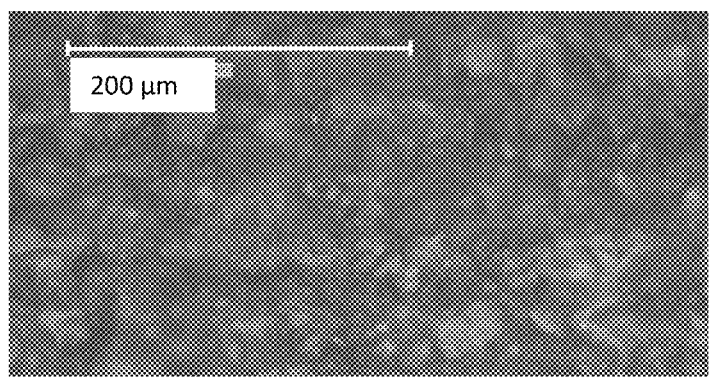
Figure 3:
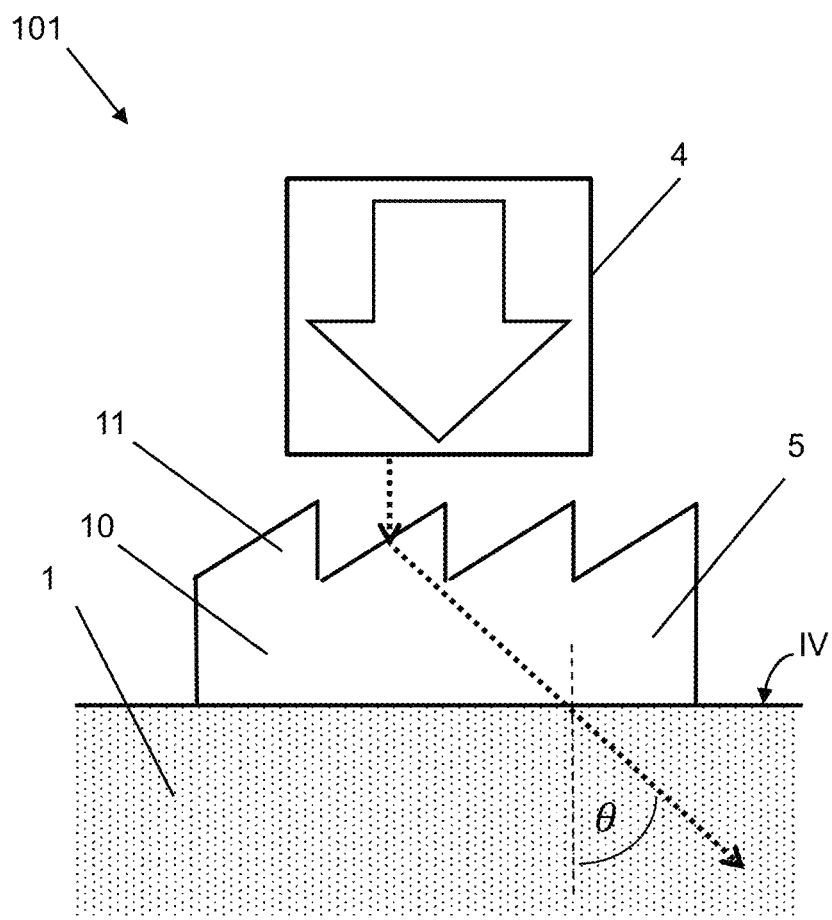
Figure 4:
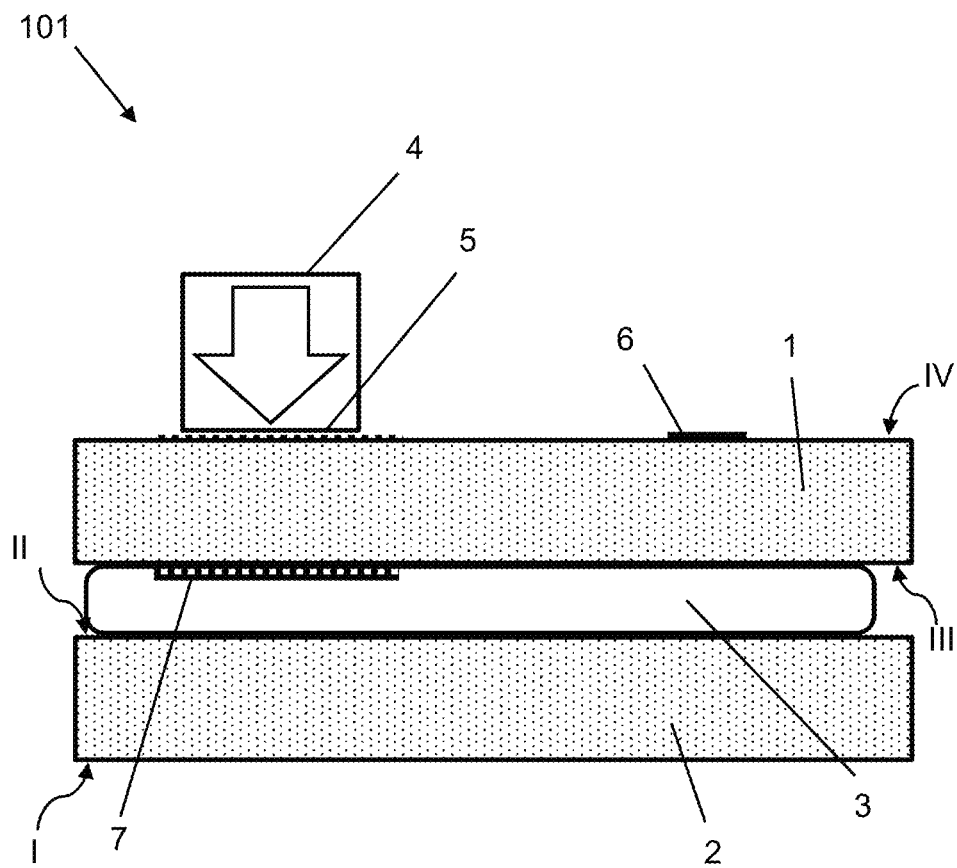
Figure 5:
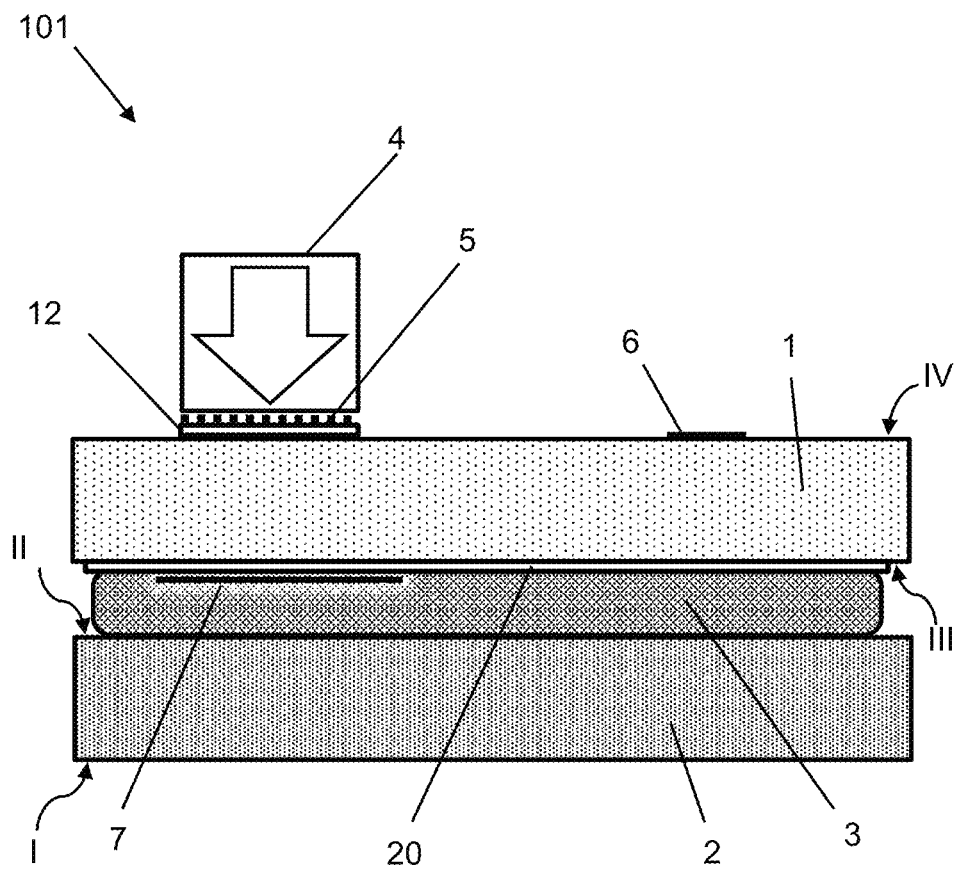

They depict:

FIG. 1A a schematic cross-sectional representation of an embodiment of a glazing according to the invention using the example of a single pane, FIG. 1B a schematic cross-sectional representation of another embodiment of a glazing according to the invention using the example of a single pane, FIG. 2A light microscope image of an exemplary embodiment of a light coupling means according to the invention, FIG. 2B light microscope image of another exemplary embodiment of a light coupling means according to the invention, FIG. 3 detail of a schematic cross-sectional representation of a glazing according to the invention having a step prism, FIG. 4 a schematic cross-sectional representation of another embodiment of a glazing according to the invention using the example of a composite pane, and FIG. 5 a schematic cross-sectional representation of another embodiment of a glazing according to the invention using the example of a composite pane.

FIG. 1A depicts a top plan view of an exemplary embodiment of a glazing 101 according to the invention using the example of a single pane. The single pane can, for example, be an automobile glazing, a construction glazing, or a component of a piece of furniture or an (electrical) appliance. For example, the glazing 101 is a roof panel of a vehicle. The glazing 101 can also be part of an insulating glazing and serve, for example, as an exterior or interior pane in a window of a building. Alternatively, the glazing 101 can be arranged in an interior and can be, for example, a glazing of a conference room.

The glazing 101 includes a pane 1, also referred to in the context of the present invention as "first pane 1". The dimensions of the first pane 1 are, for example, 1.4 m×1.5 m. The first pane 1 is made, for example, of soda lime glass. The thickness of the first pane 1 is, for example, 3 mm. It goes without saying that the thickness of the first pane 1 can be adapted to the respective use. The first pane 1 can, for example, contain toughened, partially toughened, or non-toughened glass. Alternatively, the first pane 1 can be made of a plastic, for example, polycarbonate.

The first pane 1 has a first primary surface IV and another opposing second primary surface III. The first pane 1 is further delimited by four circumferential side surfaces arranged orthogonal to the primary surfaces III, IV.

The glazing 101 includes a light source 4, for example, a light-emitting diode (LED), which emits, for example, light in the visible spectrum. The light beam of the light source 4 is directed toward the first pane 1 and strikes the primary surface IV of the first pane 1 substantially orthogonally.

Arranged between the light source 4 and the first pane 1 is a coupling means 5, which, by scattering, reflection, refraction, or diffraction, couples a major part of the light of the light source 4 into the first pane 1 at an angle θ (theta) greater than or equal to the angle of the total reflection $\theta_{total}$. The angle of the total reflection $\theta_{total}$ depends on the refractive index of the light guiding medium and is, for the present soda lime glass-pane (n=1.52) about 42°.

Due to the principle of total reflection, all light coupled into the first pane 1 at an angle $\theta \geq \theta_{total}$ in the first pane 1 propagates loss-free through the first pane 1. In FIG. 1A, this is depicted schematically by the light beam L1.

The light coupling means 5 can be designed differently. In the present exemplary embodiment, it consists of a region of the primary surface IV, in which scattering centers had been introduced into the primary surface IV by laser patterning (see also FIG. 2A and FIG. 2B, as well as the description thereof).

A light outcoupling means 6 is arranged, for example, on the second primary surface III of the first pane 1 opposite the first primary surface IV. The light outcoupling means 6 can be arranged at any desired position of the primary surface III or of the primary surface IV and is, in particular, offset relative to the light coupling means 6 (i.e., not directly opposite).

Suitable light outcoupling means 6 include, for example, patterns of the primary surface III, IV of the first pane 1 on which total reflection is prevented and light can exit the first pane 1 via the respective primary surface III, IV from the first pane 1. Alternatively, the light outcoupling means 6 can comprise an imprint on the first pane 1 or light-scattering, light-refracting, light-diffracting, or light-reflecting particles or cavities introduced into the first pane 1.

For example, here, in the present exemplary embodiment, the light outcoupling means 6 is implemented as an imprint of fine light-scattering particles on the primary surface III of the first pane 1. As a result of these, the total reflection of the light beam L1 at the interface between the first pane 1 and the surrounding air is interrupted and light is outcoupled from the first pane 1 by scattering.

FIG. 1B depicts a further development according to the invention of the glazing 101 of FIG. 1A. The glazing 101 of FIG. 1B has a structure similar to the glazing 101 of FIG. 1A such that, in the following, only the differences are discussed and, otherwise, reference is made to the description for FIG. 1A.

In contrast to FIG. 1A, the glazing 101 of FIG. 1B has a light amplification means 7 that is arranged opposite the light source 4 relative to the first pane 1. The light amplification means 7 has the task of deflecting most of the light that penetrates into the first pane 1 at an angle $\theta < \theta_{total}$ and immediately exits it due to a lack of total reflection at the interface opposite the entry surface (here, primary surface III) back into the first pane 1, preferably at an angle $\theta \geq \theta_{total}$.

Here, the light amplification means 7 preferably utilizes mechanisms of reflection, light refraction, diffraction, and/or scattering.

In the exemplary embodiment of FIG. 1B, the light amplification means 7 consists, for example, of a mirror element which is adhesively bonded to the primary surface III of the first pane 1 via a double-sided adhesive film. The mirror element is, for example, a metal foil, a metallized plastic film, or a non-metallic enhanced specular reflector film (3M ESR), as is marketed, for example, by the company 3M. As result of the adhesive bonding with a double-sided adhesive film, which is not perfectly plane-parallel due to the adhesive compound, but, instead, has a certain surface corrugation, only part of the light is reflected back directly and another part is changed in its angle.

In FIG. 1B, the paths of several light beams L1, L2, L3 are sketched in by way of example. The light beam L1 is coupled into the first pane 1 by scattering at the light coupling means 5 at an angle $\theta \geq \theta_{total}$ and propagates almost unimpeded through the first pane 1 due to total reflection. The light beam L2 enters the first pane 1 at an angle $\theta < \theta_{total}$ and leaves it again at the opposite primary surface III. There, the light beam L2 is, for example, deflected back into the first pane 1 at a changed angle $\theta \geq \theta_{total}$ and now propagates almost unimpeded through the first pane 1 due to total reflection. The path of the light beam L3 is possible with significantly lower probability. The light beam L3 also enters the first pane 1 at an angle $\theta < \theta_{total}$ and leaves it again at the opposite primary surface III. There, the light beam L3 is deflected back into the first pane 1 by the reflecting light amplification means 7, for example, at an angle $\theta < \theta_{total}$, and now hits the light coupling means 5 again from the pane side I out. There, the light beam L3 can be scattered for example, by the light coupling means 5 and deflected back into the first pane 1 at an angle $\theta \geq \theta_{total}$. There, the light beam L3 now propagates almost unimpeded through the first pane 1 due to total reflection.

The light amplification means 7 significantly increases the intensity of the light coupled into the first pane 1 under total reflection and thus also the intensity of the outcouplable light.

FIG. 2A depicts a light microscope image of an exemplary embodiment of a light coupling means 5 according to the invention. The image depicts an enlarged detail of the primary surface IV of the first pane 1, into which the light coupling means 5 is introduced by laser patterning. For this purpose, a line grid with a periodicity of 1 μm and a trench depth of 100 nm is patterned in the surface. For this, a short-pulse laser was moved linearly over the primary surface IV.

FIG. 2B depicts a light microscope image of another exemplary embodiment of a light coupling means 5 according to the invention. The image depicts an enlarged detail of the primary surface IV of the first pane 1, into which the light coupling means 5 is introduced by laser patterning. A diffuse scattering surface patterning was introduced into the surface by local ablation. For this, a short-pulse laser with a power of 10 Watts was moved in a grid pattern over the primary surface IV.

FIG. 3 depicts a detail of a schematic cross-sectional representation of another glazing according to the invention with a transparent body 10 as a light coupling means 5. The surface of the transparent body 10 facing the light source 4 has a step prism 11, which is suitable for refracting a large part of the light from the light source 4 and coupling it into the first pane 1 at an angle $\theta \geq \theta_{total}$. For this purpose, the pane contact surface of the transparent body 10 is planar and is adhesively bonded directly on the primary surface IV of the first pane 1. The transparent body 10 is made, for example, of a plastic and, in particular, from a photopolymer into which the step prism 11 is introduced by suitable micro-patterning or exposure methods. For optimal coupling in of the light, a transparent body 10 with a refractive index $n_{10}$ adapted to the refractive index $n_1$ of the first pane 1 is used, with the refractive index $n_{10}$ deviating from the refractive index $n_1$ by a maximum of 0.3.

FIG. 4 depicts a schematic cross-sectional representation of another embodiment of a glazing according to the invention using the example of a composite pane. FIG. 4 depicts a further development of the glazing 101 according to the invention of FIG. 1B. The glazing 101 of FIG. 1B has a structure similar to the glazing 101 of FIG. 4 such that, in the following, only the differences are discussed and, otherwise, reference is made to the description for FIG. 1B.

In contrast to the glazing 101 of FIG. 1B, in FIG. 4 the first pane 1 is bonded to a second pane 2 by lamination via an intermediate layer 3, for example, in an autoclave. The intermediate layer 3 is firmly bonded to the primary surface III of the first pane 1 on one side and to the primary surface II of the second pane 1 on the opposite side.

The dimensions of the glazing 101 are, for example, 1.6 m×1.5 m. The first pane 1 is intended, for example, to face the interior of a vehicle in the installed position. In other words, the first primary surface IV of the first pane 1 is accessible from the interior, whereas, in contrast, the fourth primary surface I of the second pane 2 faces outward relative to the vehicle interior. The first pane 1 and the second pane 2 are made, for example, of soda lime glass. The thickness of the first pane 1 is, for example, 1.6 mm and the thickness of the second pane 2 is, for example, 2.1 mm. It goes without saying that the first pane 1 and the second pane 2 can have any thicknesses and, for example, even the same thickness. The intermediate layer 3 is preferably made of an acoustic-damping 3-ply PVB film. The panes 1,2 and the intermediate layer 3 are, for example, clear, i.e., neither tinted nor colored.

In this example, the light coupling means 5 comprises a transparent body 10 that includes a plastic film 12 that is bonded to the primary surface IV of the first pane 1. The plastic film 12 is, for example, imprinted with light-scattering particles that diffusely scatter the light from the light source 4.

Here, for example, the light outcoupling means 6 is arranged on the first primary surface IV of the first pane 1. It goes without saying that it can be arranged on the second primary surface III of the first pane 1 or within the first pane 1. In the example of FIG. 4, the light amplification means 7 is arranged directly on the second primary surface III of the first pane 1. Furthermore, the light amplification means 7 is connected, via the intermediate layer 3, to the third primary surface II of the second pane 2. It goes without saying that a glazing according to the invention can also have multiple light sources 4, multiple light coupling means 5, multiple light outcoupling means 6, and multiple light amplification means 7.

The glazing 101 depicted in FIG. 4 is particularly well suited as a roof panel of a motor vehicle.

FIG. 5 depicts a schematic cross-sectional representation of another embodiment of a glazing 101 according to the invention. FIG. 5 depicts a further development according to the invention of the glazing 101 of FIG. 4. The glazing 101 of FIG. 5 has a structure similar to the glazing 101 of FIG.

4 such that, in the following, only the differences are discussed and, otherwise, reference is made to the description for FIG. 4.

In contrast to the glazing 101 of FIG. 4, in FIG. 5 the intermediate layer 3 consists of at least one tinted or colored PVB film. Furthermore, the second pane 2 is also tinted dark. Here, the light amplification means 7 is arranged between the first pane 1 and the intermediate layer 3, analogously to FIG. 4.

As investigations by the inventors demonstrated, the intensity of the light outcoupled via the light outcoupling means 6 decreases due to the presence of a tinted intermediate layer 3 in comparison to a glazing 101 with a clear intermediate layer 3 (see, for example, FIG. 4). This is remedied by a coating 20 (for example, an anti-reflection coating with a suitable refractive index $n_{20}$) that preserves the total reflection and is arranged directly on the primary surface III of the first pane 1. The refractive index $n_{20}$ of the coating 20 is smaller than the refractive index $n_1$ of the first pane 1. Preferably, the difference $n_1-n_{20}$ is greater than or equal to 0.1, particularly preferably greater than or equal to 0.2. In the present example, the coating 20 is, for example, an anti-reflection coating of porous SiO2 with a refractive index $n_{20}$ of, for example, 1.25, which is produced, for example, by means of a sol-gel process.

LIST OF REFERENCE CHARACTERS 1 first pane
2 second pane
3 intermediate layer
4 light source
5 light coupling means
6 light outcoupling means
7 light amplification means
10 transparent body or reflecting body
11 step prism
12 plastic film
20 coating
101 glazing
L1, L2, L3 light beam
θ angle (theta)
$θ_{total}$ angle (theta) of the total reflection
$n_1$ refractive index of the first pane 1
$n_{10}$ refractive index of the transparent or reflecting body 10
$n_{20}$ refractive index of the coating 20
I fourth primary surface, outside surface of the second pane 2
II third primary surface, inside surface of the second pane 2
III second primary surface, inside surface of the first pane 1
IV first primary surface, outside surface of the first pane 1

The invention claimed is:

1. A glazing comprising:
at least one first pane having a first primary surface and a second primary surface,
at least one light source adapted to emit light,
at least one light coupling system,
wherein the at least one light source is connected to the first primary surface of the first pane via the at least one light coupling system such that light from the at least one light source is to be coupled into the first pane,
at least one light outcoupling system for outcoupling light from the first pane via at least one of the first and second primary surfaces, and
at least one light amplification system arranged locally on a portion of the second primary surface of the first pane and opposite the light coupling system such that the at least one light amplification system is arranged at least in a region of orthogonal projection of the at least one light coupling system onto the first pane, the at least one light amplification system being adapted to deflect at least a portion of the light emitted by the at least one light source and incident on the at least one light amplification system back to the at least one light coupling system.

2. The glazing according to claim 1, wherein a second pane is connected to the first pane by at least one intermediate layer.

3. The glazing according to claim 1, wherein the at least one light source includes or consists of a light-emitting diode, a laser diode, an incandescent lamp, and/or a gas discharge lamp.

4. The glazing according to claim 1, wherein the at least one light coupling system is adapted to deflect part of the light incident from the light source in transmission by scattering, reflection, refraction, or diffraction and to couple it into the first pane at an angle θ greater than or equal to the angle ° total of the total reflection.

5. The glazing according to claim 1, wherein the at least one light coupling system
is introduced into the first primary surface of the first pane, and/or
is printed onto the first primary surface of the first pane, and/or
is part of the at least one light source, and/or
is a transparent body that is materially connected to the first primary surface of the first pane,
wherein the transparent body contains or is made of
a patterned plastic film or plastic sheet, or
a holographic film,
and
wherein the following applies to a refractive index $n_1$ of the first pane and a refractive index $n_{10}$ of the transparent body: $n_{10}$ is from $n_1-0.3$ to $n_1+0.3$.

6. The glazing according to claim 1, wherein the at least one light outcoupling system is adapted for light outcoupling of light guided in the first pane at at least one at least one of the first and second primary surfaces of the first pane.

7. The glazing according to claim 1, wherein the at least one light outcoupling system
is introduced into the first primary surface and/or into the second primary surface, and/or
is materially connected to the first primary surface and/or to the second primary surface of the first pane, and/or
is arranged within the first pane, and/or
is a transparent body, wherein the transparent body contains or consists of
a) a patterned plastic film or plastic sheet, or
b) a transmission-holographic film,
and/or
is a reflecting body,
wherein the reflecting body contains or consists of
c) a patterned plastic film or plastic sheet, or
d) a reflection holographic film,
and/or
is a transparent body,
wherein the transparent body has or consists of a patterned layer, or plastic sheet and whose refractive index $n_{10}$ is substantially greater than a refractive index $n_1$ of the first pane by at least +0.2.

8. The glazing according to claim 1, wherein the at least one light amplification system deflects light emerging from the first pane back into the first pane by reflection, scattering, or diffraction.

9. The glazing according to claim 1, wherein the at least one light amplification system is materially bonded to the second primary surface of the first pane directly or via at least one intermediate layer or via at least one adhesive layer.

10. The glazing according to claim 1, wherein the at least one light amplification system contains or consists of a metal foil, a metallized plastic film, or a nonmetallic enhanced specular reflector film.

11. The glazing according to claim 1, wherein a semi-transparent reflective coating is arranged at least in some sections and directly on the second primary surface of the first pane.

12. The glazing according to claim 1, wherein the first pane and/or a second pane of the glazing contains or is made of glass, or polymers, and/or mixtures or combinations thereof.

13. The glazing according to claim 2, wherein the intermediate layer contains or consists of at least one thermoplastic plastic film.

14. A glazing arrangement comprising a glazing according to claim 1, and a voltage source or control electronics connected to the at least one light source.

15. A method for producing a glazing according to claim 1, comprising:

arranging a light-scattering, light-reflecting, light-refracting, or light-diffracting, light coupling system on a first primary surface of a first pane, and arranging at least one light source at the light coupling system as well as arranging at least one light outcoupling system at or in the first pane.

16. A method comprising providing the glazing according to claim 1 in a vehicle of locomotion for travel on land, in the air, or on water, or in a built-in part in furniture, appliance, or building, or as building glazing in construction sector or architectural sector in interior or exterior.

17. The glazing according to claim 4, wherein the scattering is diffuse scattering.

18. The glazing according to claim 4, wherein the light coupling system is adapted to deflect part of the light incident from the at least one light source to increase the proportion of the light coupled into the first pane from the light source at an angle $\theta$ greater than or equal to the angle $\theta_{total}$ of the total reflection by a factor of at least 50.

19. The glazing according to claim 5, wherein the at least one light coupling system is introduced into the first primary surface by laser patterning, mechanical patterning, and/or etching.

* * * * *

UNITED STATES PATENT AND TRADEMARK OFFICE
CERTIFICATE OF CORRECTION

| | | |
|---|---|---|
| PATENT NO. | : 11,982,830 B2 | Page 1 of 1 |
| APPLICATION NO. | : 18/005316 | |
| DATED | : May 14, 2024 | |
| INVENTOR(S) | : Tobias Nielsen et al. | |

It is certified that error appears in the above-identified patent and that said Letters Patent is hereby corrected as shown below:

On the Title Page

In Item (72) Inventors, the inventor's residence should read:
Tobias Nielsen, Köln, (DE), Semjon Mooraj, Aachen (DE)

Signed and Sealed this
Eighteenth Day of June, 2024

Katherine Kelly Vidal
*Director of the United States Patent and Trademark Office*